UNITED STATES PATENT OFFICE.

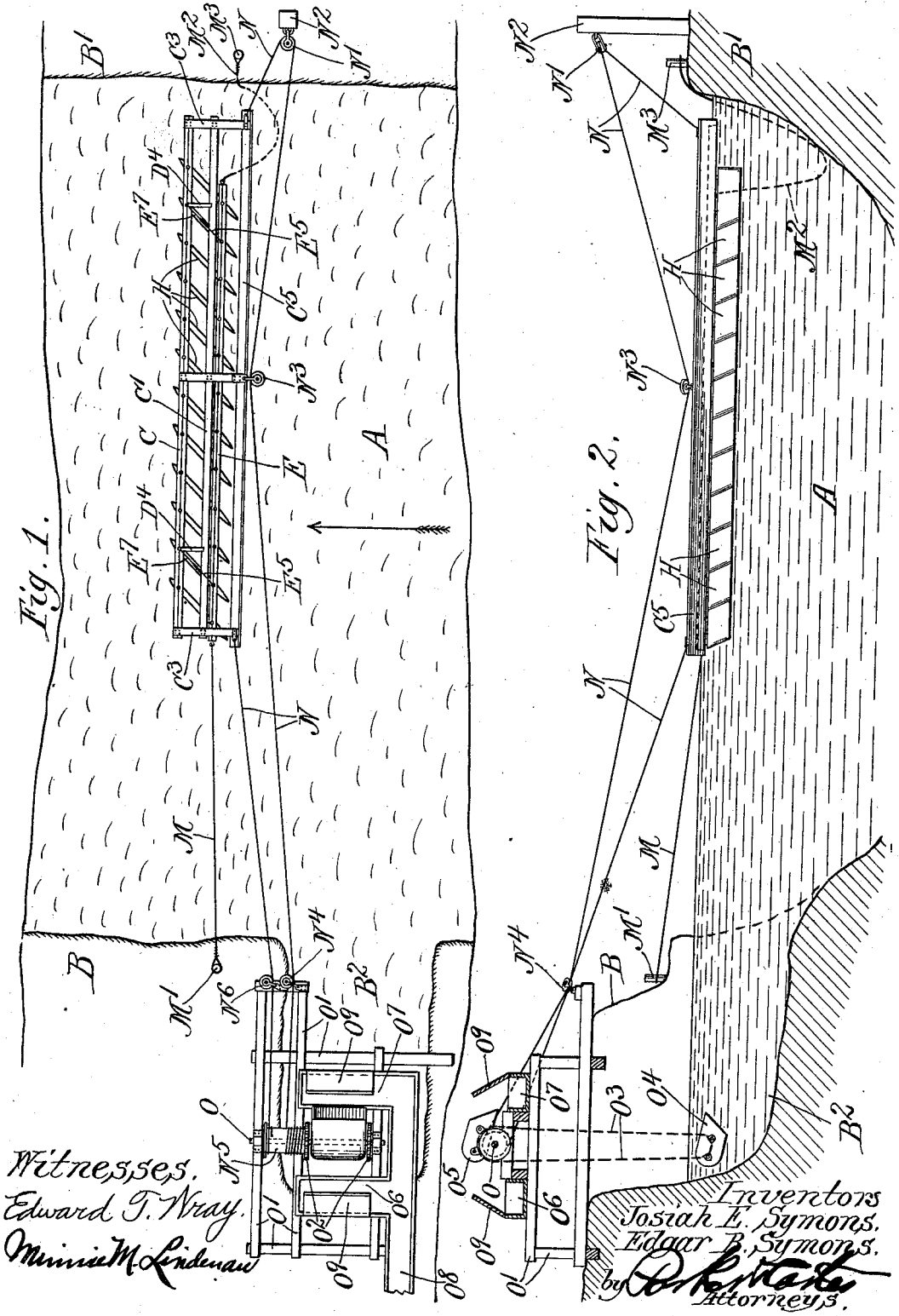

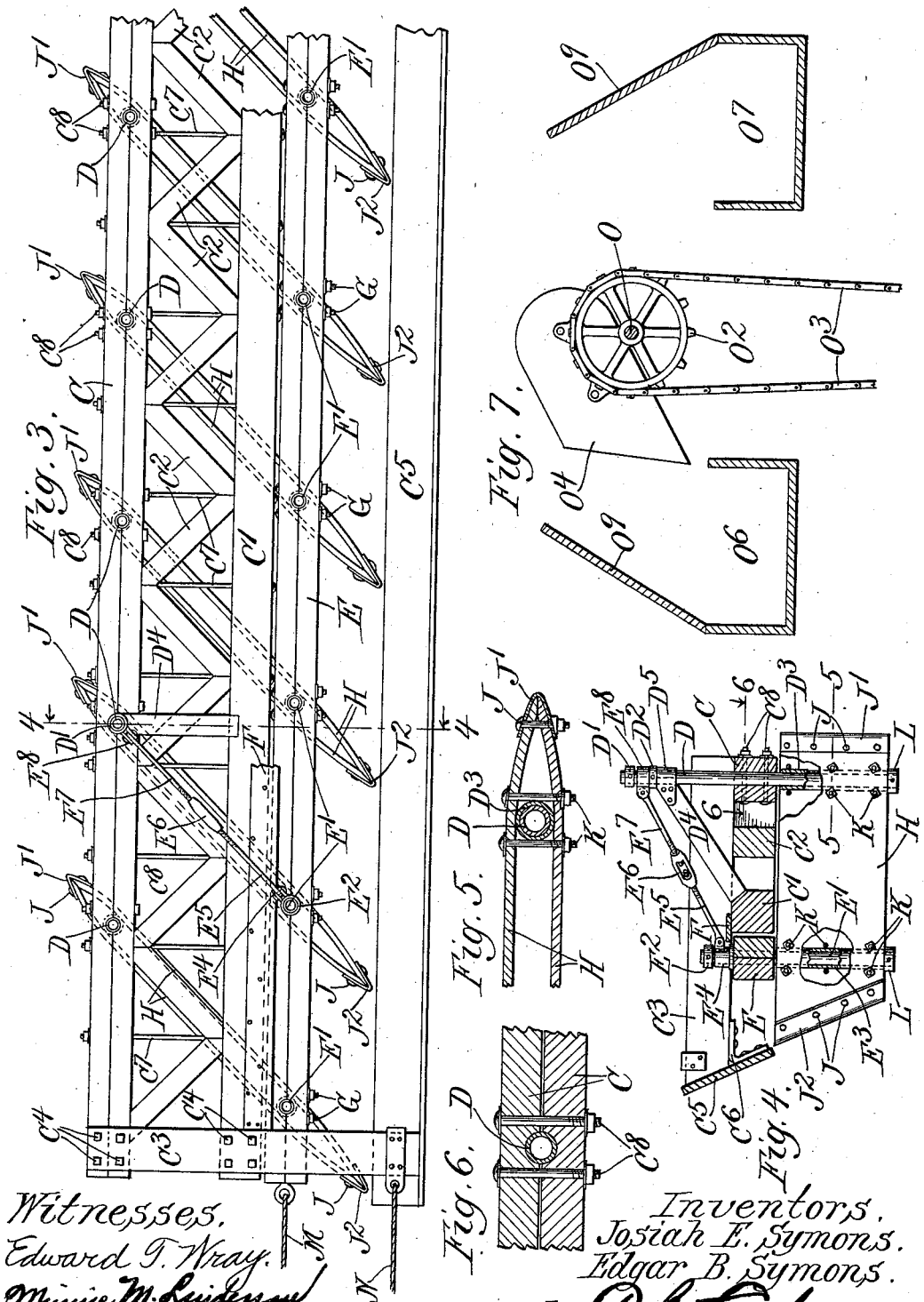

JOSIAH E. SYMONS, OF CHICAGO, ILLINOIS, AND EDGAR B. SYMONS, OF MILWAUKEE, WISCONSIN.

CURRENT-MOTOR.

1,000,351.  Specification of Letters Patent.  Patented Aug. 8, 1911.

Application filed May 14, 1908. Serial No. 432,816.

*To all whom it may concern:*

Be it known that we, JOSIAH E. SYMONS and EDGAR B. SYMONS, citizens of the United States, residing at Chicago, in the county of Cook and State of Illinois, and Milwaukee, in the county of Milwaukee and State of Wisconsin, respectively, have invented a certain new and useful Improvement in Current-Motors, of which the following is a specification.

Our invention relates to current motors.

It is illustrated in the accompanying drawings, wherein—

Figure 1 is a plan view, Fig. 2, a longitudinal section and side elevation; Fig. 3, an enlarged detail of the motor; Fig. 4, a cross section on the line 4—4 of Fig. 3; Fig. 5, a cross section on line 5—5 of Fig. 4; Fig. 6, a cross section on line 6—6 of Fig. 4; Fig. 7, a detail cross section at the top of the elevator.

Like parts are indicated by the same letters in all the figures.

A is the body of water of a river flowing between the banks B, B$^1$.

B$^2$ is a pocket at the side of the river formed for convenience in elevating the water for we have shown our motor as applied to water elevating and pumping, and the elevator mechanism is conveniently placed at one side of and away from the river.

The motor proper consists of the float having the rearward timber C, the forward timber C$^1$, the lattice work brace bars C$^2$ C$^2$ between these two timbers, end bars C$^3$ bolted at C$^4$ to the longitudinal timbers and the inclined deflector plate C$^5$ bearing against the outer beveled ends of the bars C$^3$ and connected thereto by the angle bars C$^6$. The timber C is preferably composed of two parts bolted together. This is preferably done by first boring holes for the vertical rods, then longitudinally severing the timber into two pieces, and then bolting them together on the pipes or rods so as to finally clamp these in position. The timber C is secured to the timber C$^1$ by the tie-rod C$^7$ properly distributed. Short bolts C$^8$ serve to hold the two parts of the timber C together.

D, D are a series of vertical rods provided if necessary each with two collars D$^1$, D$^2$ above and each loose in its socket D$^3$ below. To steady and hold the rod a brace D$^4$ having an eye D$^5$ which encircles the rod is provided which bears upon the lower part of the collar D$^2$. The other end of the brace D$^4$ is framed into the timber C$^1$. There may be as many of these braces as may be necessary, as for example, one for each rod, although I have not shown it so. The rod D may be tubular or solid.

E is a timber composed of two strips like the timber C and it is provided with a series of rods E$^1$ which are provided each with a collar E$^2$ at the top and rest in a socket E$^3$ at the bottom. Below the collar is an eye E$^4$ which encircles the rod and to which is attached one end of the rod E$^5$, the other end of which is secured in the turn buckle E$^6$ to which is secured one end of the rod E$^7$, the other end of which is attached to the eye E$^8$ which encircles the rod D beneath the collar D$^1$. On the timber C$^1$ lies a strip F which projects over the rear edge of the timber E when the parts are as indicated in Fig. 3. The two strips which form the timber E are connected by the short bolts G, G.

H, H are side plates spaced by the sockets D$^3$ and E$^3$, and with their edges, forward and rearward, drawn together by the bolts J and protected by the sharp edged protecting plates J$^1$ at the rear and J$^2$ at the front. This latter is inclined at any desired angle at its outer edge approximately in the plane of the outer surface of the deflecting strip C$^5$ when the parts are in the position shown in Fig. 3. The two plates H H are held together by the cross bolts K K. Collars L, L on the lower ends of the rods or tubes serve to keep the plates H, H in working relation to the other parts.

The timber E has at one end a rope M which is made fast to a stake or anchor M$^1$ on one bank of the river while the other end of the rope M$^2$ is made fast to the anchor M$^3$ on the opposite shore. To the side bars C$^3$ at their forward ends are secured the two ends of a continuous cable N which passes over the pulley N$^1$ on the shore anchor N$^2$, the pulley N$^3$ on the middle part of the bar C$^5$, the pulley N$^4$ on the shore, around the drum N$^5$, thence over the pulley N$^6$ and back to the other end of the deflector plate C$^5$. This drum is mounted on a shaft O in a frame O$^1$ and carries sprocket wheels $O^2$ on which runs the chain $O^3$ which carries the buckets $O^4$ $O^5$.

$O^6$ is a water trough on one side of the shaft and $O^7$ is a water trough on the other side, and both of these open into the inclined trough $O^8$. Both of the troughs preferably have guard plates $O^9$ above them.

It will be readily understood that our drawings are in an important sense diagrammatic and yet they are intended to give and do give a substantially accurate view of a complete apparatus wherein our invention is embodied. We do not wish to be limited to the particular form, construction and arrangement of the parts shown as a great deal of modification can be indulged in without departing from the spirit of our invention.

The use and operation of our invention are as follows: Assuming that the parts are in the position shown in Fig. 1 and the current is flowing in the direction indicated by the arrow, it is evident that the impact of the current on the inclined propeller blades will move the float toward the left. This, of course, by operating the continuous cable N will operate the drum $N^5$, shaft O, sprocket wheels $O^2$, chain $O^3$ and lift the bucket $O^4$ into the position shown in Fig. 7 where the bucket has discharged its contents into the trough $O^6$. There may, of course be any desired number of these buckets and they may be spaced in any desired manner. The bucket in question thus raised will discharge its contents of water into the trough $O^6$. In the drawing the bucket $O^5$ will be seen as just having discharged its contents into the trough $O^7$. When the float has just reached approximately the limit of its excursion the rope $M^2$ will be taut and tend to pull the propeller blades in the opposite direction. The motion of the float continuing, these propeller blades are turned in the opposite direction until the on-coming current strikes their previously rearward sides, whereupon they move into position in a sense opposite to that shown in Fig. 1, and the float begins to move in the opposite direction. Thus the device continues to operate, emptying first one bucket and then the other into its respective trough and serves to pump water, or supply from the stream by the action of the current a continuous supply of water to the pipes for distribution for any desired purpose, for example, irrigation. The rod or pipe $E^1$ is pivotally associated with the blade and with the bar E and in like manner the rod D is pivotally associated with the blade and indeed the pivot of the brace $D^4$ serves as a strengthening piece for the float and to support the top of the rod D. $E^2$ is in like manner a strengthening piece or brace. When the float has reached the opposite side of the stream the rope $M^2$ will become taut and as suggested the float will continue its motion until the propeller blades, the front ends of which are pivotally attached to the timber E, shall have been swung on their rear pivots until their forward ends shall have passed to the other side of the line transverse to the float and through their rear pivots, whereupon the action of the water will tend to force them to the limit of their excursion in the opposite direction. The further action of the current, of course, is to cause the float to return to the opposite side and thus it continues to move back and forth across the stream rotating the shaft O and lifting first one and then the other bucket to the top to deposit its load of water in the trough. Obstructions or drift wood coming down the stream will strike the deflector plate $C^5$ and the forward sharpened and inclined plates $J^2$ on the forward edges of the propeller blades and pass down and under the float.

The floating frame we have designated a float as it may take any form or shape. The double plate propeller blades are pivoted to the float and to the longitudinally movable timber or bar. The plate F over hangs the space between the float and the bar so as to form a water cushion when the bar or timber E is settling back against the float into the position, for example, as shown in Fig. 3. The end ropes or anchor ropes or chains are secured to the ends of the longitudinally movable bar, the object being to get relative motion between the bar and the float and it will be possible to have the float in front of the bar or to make the structure such that the timber E will be considered the float and the other portion of the structure the movable part. This device serves to reverse the inclination of the propeller blades to the direction of the current of the stream. I have called this floating frame a free float to differentiate it from floats which ride upon tracks and are not actual floats at all. This float is free to move transversely across the stream subject to the limitation of the ropes attached at its end and is also able to move parallel with the stream subject to the same limitation. It must therefore be considered as a free float.

We have shown the device as employed to operate as a drum and shaft but of course any kind of driven part could be connected up so as to be driven by our mechanism.

We claim:

1. A current motor comprising a free float, adapted to move laterally across the surface of the stream, a series of propeller blades pivotally mounted thereon, and means for reversing their inclination to the direction of the current, said means responsive to the motion of the float.

2. A current motor comprising a free float adapted to move laterally across the surface of the stream, a longitudinally movable part thereon, a series of propeller blades pivotally connected with the float at one end, and with the movable part at the other, and means for reversing their inclination to the direction of the current, said means responsive to the transverse motion of the float.

3. A current motor comprising a free float adapted to move laterally across the stream, a longitudinally movable part thereon, a series of propeller blades pivotally connected with the float at one end, and with the movable part at the other, and means for reversing their inclination to the direction of the current, comprising anchor ropes of limited length attached to the movable part.

4. A current motor comprising a free float adapted to move laterally across the surface of the stream, a connection therefrom to the part to be driven, a series of propeller blades pivotally mounted on the float and means for reversing their inclination to the direction of the current, said means responsive to the lateral motion of the float.

5. A current motor comprising a free float adapted to move laterally across the surface of the stream, an endless cable connected with the two ends of the float and passing around the part to be driven on one side of the stream and around any suitable device on the other side of the stream.

6. A current motor comprising a free float adapted to move laterally across the surface of the stream, an endless cable connected with the two ends of the float and passing around the part to be driven on one side of the stream and around any suitable anchoring means on the other side of the stream and a series of propeller blades pivotally mounted on the float.

7. A current motor comprising a free float adapted to move laterally across the surface of the stream, an endless cable connected to the two ends of the float and passing around the part to be driven on one side of the stream and around any suitable anchoring device on the other side of the stream, a series of propeller blades pivotally mounted on the float and means for reversing their inclination to the direction of the current, said means responsive to the lateral motion of the float.

8. A current motor comprising a free float adapted to move laterally across the stream, an endless cable connected to the two ends of the float and passing around the part to be driven, a series of propeller blades pivotally mounted on the float, and means for reversing their inclination to the direction of the current, comprising anchor chains of limited length connected to said blades.

9. A current motor comprising a free float adapted to move laterally across the surface of the stream, an endless cable connected with the two ends of the float, passing around the part to be driven on one side of the stream and around any suitable anchoring means on the other side of the stream, a series of propeller blades pivotally attached on the float, a longitudinally movable part on the float to which the propeller blades are also attached and means for reversing the inclination of the propeller blades to the direction of the current, said means responsive to the lateral movement of the float.

10. A current motor comprising a float, an endless cable connected to the two ends of the float and passing around the part to be driven, a series of propeller blades pivotally attached on the float, a longitudinally movable part on the float to which the propeller blades are also attached, and means for reversing the inclination of the propeller blades to the direction of the current comprising anchor ropes attached to the ends of such movable part and of limited length.

11. A current motor comprising a float, a series of propeller blades pivotally mounted thereon, and means for reversing their inclination to the direction of the current comprising anchor chains at the ends of the float and of limited length and connected to such blades.

12. A current motor comprising a free float adapted to move laterally across the surface of the stream, an endless cable from shore to shore, its ends connected to the two ends of the float and connected with the part to be driven intermediate its ends on one side of the stream and passing around any suitable pulley device on the other side of the stream.

13. A current motor comprising a free float adapted to move laterally across the surface of the stream, an endless cable from shore to shore, its ends connected to the two ends of the float and connected with the part to be driven intermediate its ends on one side of the stream and with any suitable pulley device on the other side of the stream and pivoted propeller blades mounted on the float.

14. A current motor comprising a free float adapted to reciprocate laterally across the surface of the stream, an endless cable from shore to shore, its ends connected to the two ends of the float and connected with the part to be driven intermediate its ends on one side of the stream, passing around some suitable pulley device on the other side of the stream, pivoted propeller blades mounted on the float and means for reversing their inclination to the direction of the current, said means responsive to the transverse motion of the float.

15. A current motor comprising a float, an endless cable from shore to shore, its ends connected to the two ends of the float and connected with the part to be driven intermediate its ends, pivoted propeller blades mounted on the float, and means for reversing their inclination to the direction of the current, comprising anchor ropes at the ends of the float of limited length and connected to the propeller blades.

16. A current motor comprising a float, an endless cable from shore to shore, its ends connected to the two ends of the float and connected with the part to be driven intermediate its ends, pivoted propeller blades mounted on the float, means for reversing their inclination to the direction of the current, comprising anchor ropes at the ends of the float of limited length and connected to the propeller blades, and a movable part whereby the connection is made from the anchor ropes to the blades, the latter pivotally connected therewith.

17. A current motor comprising a free float adapted to move laterally across the surface of the stream, means on the float for causing the current to move it back and forth across the stream, a part to be driven, and a connection from the float to the driven part.

18. A current motor comprising a free float adapted to move laterally across the surface of the stream, means on the float for causing the current to move it back and forth across the stream, a part to be driven, and a connection from the float to the driven part, consisting of an endless cable, its ends secured to the ends of the float and attached to the part to be driven intermediate its ends on one side of the stream and passing about a suitable pulley device on the other side of the stream.

19. A current motor comprising an endless cable traveling over pulleys on opposite sides of the stream, a free float adapted to move laterally across the surface of the stream, to which its two ends are connected, a driven part with which it is connected intermediate its ends, and means on the float for moving the float back and forth across the current.

20. A current motor comprising an endless cable traveling over pulleys on opposite sides of the stream, a free float adapted to move laterally across the surface of the stream, to which its two ends are connected, a driven part with which it is connected intermediate its ends, and means for moving the float back and forth across the current, said means consisting of propeller blades pivoted on the float.

21. A current motor comprising an endless cable traveling over pulleys on opposite sides of the stream, a free float adapted to move laterally across the surface of the stream and to which its two ends are connected, a driven part with which it is connected intermediate its ends, means for moving the float back and forth across the current, said means consisting of propeller blades pivoted on the float, and means for reversing their inclination to the direction of the current, said means responsive to the motion of the float.

22. In a current motor, the combination of a floating frame with downwardly depending rods, a timber longitudinally movably mounted on said frame and having downwardly depending rods, and propeller blades connected each to a pair of such rods.

23. In a current motor, the combination of a float, with a forwardly inclined deflecting board, and a series of propeller blades pivotally mounted on the float, their forward ends inclined on a line with the board.

24. In a current motor, a float in combination with a series of propeller blades which comprise two plates drawn together at their ends to make a sharp edge, and intermediate rod sockets whereby they are secured to the float.

25. A current motor comprising a float with a series of rods projecting above and below the same, a timber longitudinally movably mounted on the float, a series of rods downwardly depending therefrom, and tie-rods from the top of such timber to the top of the upwardly projecting rods on the float, and propeller blades mounted on such rods below the float.

26. A current motor comprising a float, a longitudinally movable timber mounted on said float and in front of the same, propeller blades pivoted to the float and to the timber, and an overhanging strip to form a water cushion between the front of the float and the rear of the longitudinally movable timber.

27. A current motor, comprising a free float adapted to move transversely across the stream, a series of propeller blades pivotally mounted thereon and means for reversing their inclination to the direction of the current, power transmitting means from the float to the bank of the stream, said means adapted to permit a limited displacement parallel with the stream.

28. A current motor comprising a free float adapted to move laterally across a stream, a longitudinally movable part therein, a series of propeller blades pivotally connected with the float and with the movable part, and means for reversing their inclination to the direction of the current comprising stops engaging the movable part.

29. A current motor comprising a float free to move across and parallel with the direction of the stream, a longitudinally movable part therein, a series of propeller blades pivotally connected with the float and movable part and means for reversing their inclination to the direction of the current.

30. A current motor comprising a float free to move across and parallel with the direction of the stream, said float supported upon the surface of the stream, means for moving said float back and forth across the stream, said means comprising a longtudinally movable part, a series of propeller blades pivotally connected with the float and movable part and means for reversing the inclination of said blades to the direction of the current.

JOSIAH E. SYMONS.
EDGAR B. SYMONS.

Witnesses:
EDNA K. REYNOLDS,
LUCY A. FALKENBERG.

Copies of this patent may be obtained for five cents each, by addressing the "Commissioner of Patents, Washington, D. C."